(12) United States Patent
Mosher et al.

(10) Patent No.: US 6,576,078 B2
(45) Date of Patent: Jun. 10, 2003

(54) FLASHLESS HOT MELT BONDING OF ADHESIVES FOR IMAGEABLE SEAMED BELTS

(75) Inventors: Ralph A. Mosher, Rochester, NY (US); Ihor W. Tarnawskyj, Webster, NY (US); Matthew J. Torpey, Pittsford, NY (US); William M. Prest, Jr., Webster, NY (US); Jodie L. Watson, Webster, NY (US)

(73) Assignee: Xerox Corporation, Stamford, CT (US)

(*) Notice: Subject to any disclaimer, the term of this patent is extended or adjusted under 35 U.S.C. 154(b) by 65 days.

(21) Appl. No.: 09/833,964

(22) Filed: Apr. 11, 2001

(65) Prior Publication Data

US 2003/0051810 A1 Mar. 20, 2003

(51) Int. Cl.$^7$ .............................. B32B 31/20; C09J 5/06
(52) U.S. Cl. ................... 156/155; 156/289; 156/304.1; 156/304.2
(58) Field of Search ................ 156/73.4, 73.5, 156/155, 157, 166, 176, 230, 239, 241, 244, 27, 247, 249, 272.2, 273.5, 275.1, 275.3, 288, 289, 304.1, 311, 323, 324, 326, 330, 331.6, 304.2; 428/41.8, 42.3, 58

(56) References Cited

U.S. PATENT DOCUMENTS

| | | | | | |
|---|---|---|---|---|---|
| 5,049,434 A | * | 9/1991 | Wasulko | ...................... | 156/230 |
| 5,667,884 A | * | 9/1997 | Bolger | ...................... | 156/320 |
| 6,387,199 B1 | * | 5/2002 | DeCrescentis et al. | ... | 156/304.1 |

* cited by examiner

Primary Examiner—Richard Crispino
Assistant Examiner—Sing P Chan
(74) Attorney, Agent, or Firm—Annette L. Bade

(57) ABSTRACT

A process for flashless hot melt bonding of seamed flexible belts having a substrate and a seam having interlocking seam members, wherein the interlocking seam members are held together by an adhesive for use in electrostatographic, contact electrostatic, digital and other like machines, wherein the process includes: a) providing a release layer having an adhesive strip on a front side of the release layer, wherein the release layer is wider than the adhesive strip; b) providing the release layer containing the adhesive strip over the seam, wherein the front side of the release layer containing the adhesive strip is in contact with the seam and mutually mating members; c) thermal compressive adhesive bonding of the release layer to the seam, and d) optionally postcuring the seam; and wherein virtually no flashing of the adhesive outside the seam occurs.

22 Claims, 10 Drawing Sheets

FLASHLESS HOT MELT BONDING OF ADHESIVES FOR IMAGEABLE SEAMED BELTS

CROSS REFERENCE TO RELATED APPLICATIONS

Attention is directed to U.S. patent application Ser. No. 09/493,445 (D/97525D), filed Jan. 28, 2000, entitled "Process and Apparatus for Producing an Endless Seamed Belt;" U.S. patent application Ser. No. 09/470,931 (D/99689) filed Dec. 22, 1999, entitled, "Continuous Process for Manufacturing Imageable Seamed Belts for Printers;" U.S. patent application Ser. No. 09/088,011, (D/97683), filed May 28, 1998, entitled, "Unsaturated Carbonate Adhesives for Component Seams;" U.S. patent application Ser. No. 09/615,444 (D/99598), filed Jul. 13, 2000, entitled, "Polyimide Adhesive For Polyimide Component Interlocking Seams;" U.S. patent application Ser. No. 09/615,426 (D/99598Q), filed Jul. 13, 2000, entitled, "Process For Seaming Interlocking Seams Of Polyimide Component Using Polyimide Adhesive"; U.S. patent application Ser. No. 09/660,248 (D/99610), filed Sep. 13, 2000, entitled, "Imageable Seamed Belts Having Fluoropolymer Adhesive Between Interlocking Seaming Members;" U.S. patent application Ser. No. 09/660,249 (D/99610Q), filed Sep. 13, 2000, entitled, "Imageable Seamed Belts Having Fluoropolymer Overcoat;" U.S. patent application Ser. No. 09/833,930 filed Apr. 11, 2001, entitled, "Imageable Seamed Belts Having Hot Melt Processable, Thermosetting Resin and Conductive Carbon Filler Adhesive Between Interlocking Seaming Members;" U.S. patent application Ser. No. 09/833,965, filed Apr. 11, 2001, entitled, "Conductive Carbon Filled Polyvinyl Butyral Adhesive;" U.S. patent application Ser. No. 09/833,488, filed Apr. 11, 2001, entitled, "Dual Curing Process for Producing A Puzzle Cut Seam;" U.S. patent application Ser. No. 09/833,546 filed Apr. 11, 2001, entitled "Imageable Seamed Belts Having Polyamide Adhesive Between Interlocking Seaming Members; and U.S. patent application Ser. No. 09/833,507 filed Apr. 11, 2001, entitled "Polyamide and Conductive Filler Adhesive." The disclosures of each of these references are hereby incorporated by reference in their entirety.

BACKGROUND OF THE INVENTION

The present invention is directed to a process for producing belts useful in electrostatographic, including digital apparatuses. In specific embodiments, the present invention is directed to a process for preparing seamed belts, and more specifically, to endless flexible seamed belts wherein an image can be transferred at the seam of the belt with little or no print defects caused by the seam. In embodiments, the present invention relates to a process for producing xerographic component imageable seamed belts comprising an adhesive formed between mutually mating elements of a seam. The present invention further provides, in embodiments, a process wherein virtually no flashing of excess adhesive from thermal compressive or hot melt adhesive bonding of the seam members occurs. The present invention further provides, in embodiments, a process wherein residual adhesive over the seam is of a controlled geometry, resulting in a tapered mound or bump. The present invention further provides, in embodiments, a process wherein any residual adhesive bump formed after bonding of the seam, can be easily removed by a finishing process to a height equivalent to the surrounding belt.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

In a more typical electrostatographic reproducing apparatus, the developer consists of polymeric coated magnetic carrier beads and thermoplastic toner particles of opposite tribo polarity with respect to the carrier beads. This is a dry xerographic process.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member electrostatically under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer members are suitable for high performance applications because of their outstanding mechanical strength and thermal stability, in addition to their good resistance to a wide range of chemicals. However, the high cost of manufacturing unseamed polyimide belts has led to the introduction of a seamed belt. Even polyimides with the best mechanical and chemical properties often exhibit poor adhesion at the seam even when commercially available primers and adhesives are used.

In the electrostatic transfer applications, use of a seamed transfer polyimide member results in insufficient transfer in that the developed image occurring on the seam is not adequately transferred. This incomplete transfer is partially the result of the difference in seam height to the rest of the belt. A "bump" is formed at the seam, thereby hindering transfer and mechanical performance. The development of puzzle cut seams has increased the quality of transfer somewhat, by decreasing the seam height, thereby allowing smooth cycling.

Currently, the process for seaming involves placing a strip of release layer/adhesive cut slightly wider than the puzzle cut seam over the seaming members. The adhesive is then compression molded into the puzzle cut seam at an elevated temperature. This compression molding, while filling the seam, leaves undesirable flashing of excess adhesive at both edges of the release liner that is difficult to remove during the seam finishing process. The flashing causes extra time to be spent trying to remove the excess adhesive. This results in increased labor manufacturing costs, and hence a more expensive product. In addition, not all the excess adhesive can be removed following thermal compressive adhesive bonding and therefore, the excess adhesive can cause a bump at the seam. The result is a decrease in transfer or image quality and mechanical performance of the belt, and ultimately, a decrease in belt life and customer satisfaction. A bump in the belt may introduce poor motion quality into the system as it passes various elements such as cleaning blades, roller nips, and others.

Therefore, it is desired to provide a process, which reduces or eliminates the occurrence of flashing of excess adhesive at both edges of the release liner.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a mechanically invisible seam, which is substantially equivalent in performance to a seamless belt.

SUMMARY OF THE INVENTION

Embodiments of the present invention include: a process for flashless hot melt adhesive bonding of an endless seamed flexible belt, wherein the belt comprises a first end and a second end, each of the first end and the second end comprising a plurality of mutually mating elements which join in an interlocking relationship to form a seam, the belt comprising a substrate and the seam comprising an adhesive, the process comprising: a) providing an adhesive strip on a front side of a release layer, wherein the release layer is wider than the adhesive strip; b) providing the release layer containing the adhesive strip over the seam, wherein the front side of the release layer containing the adhesive strip is in contact with the seam and mutually mating members; and c) subjecting the adhesive strip to thermal compressive bonding, wherein the adhesive strip melts and flows between the mutually mating members.

In addition, embodiments of the present invention include: a process for flashless hot melt adhesive bonding of an endless seamed flexible belt, wherein the belt comprises a first end and a second end, each of the first end and the second end comprising a plurality of mutually mating elements which join in an interlocking relationship to form a seam, the belt comprising a substrate and the seam comprising an adhesive, the process comprising: a) providing an adhesive layer on a front side of a release layer so as to cover an entire width of the release layer; b) removing an amount of adhesive strip from the release layer; c) providing the release layer containing the adhesive strip over the seam, wherein the front side of the release layer containing the adhesive strip is in contact with the seam and mutually mating members; and d) subjecting the adhesive strip to thermal compressive adhesive bonding, wherein the adhesive strip melts and flows between the mutually mating members.

Embodiments further include: a process for flashless hot melt adhesive bonding of an endless seamed flexible belt, wherein the belt comprises a first end and a second end, each of the first end and the second end comprising a plurality of mutually mating elements which join in an interlocking relationship to form a seam, the belt comprising a substrate and the seam comprising an adhesive comprising a resin selected from the group consisting of polyamide resins, polyvinyl butyral resins, phenolic resins, epoxy resins, and mixtures thereof, the process comprising: a) providing an adhesive strip on a front side of the release layer, wherein the release layer is wider than the adhesive strip; b) providing the release layer containing the adhesive strip over the seam, wherein the front side of the release layer containing the adhesive strip is in contact with the seam and mutually mating members; and c) applying the release layer to the seam, wherein the adhesive strip is thermally compressive bonded between the mutually mating members.

BRIEF DESCRIPTION OF THE DRAWINGS

For a better understanding of the present invention, reference may be had to the accompanying figures.

DETAILED DESCRIPTION OF THE PRESENT INVENTION

The present invention relates to a process for preparing an endless flexible seamed belt having a puzzle cut seam, wherein in embodiments, the final seam is prepared with little or no flashing of excess adhesive from the edges of the seam.

In preferred embodiments, the belt is an intermediate transfer belt, sheet, roller, or film useful in xerographic, including digital, apparatuses. However, the belts prepared by the process described herein can be useful as belts, rollers, drelts (a hybrid of a drum and a belt), and the like, for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the belts, herein, can be used for both liquid and dry powder xerographic architectures.

Figure 1:
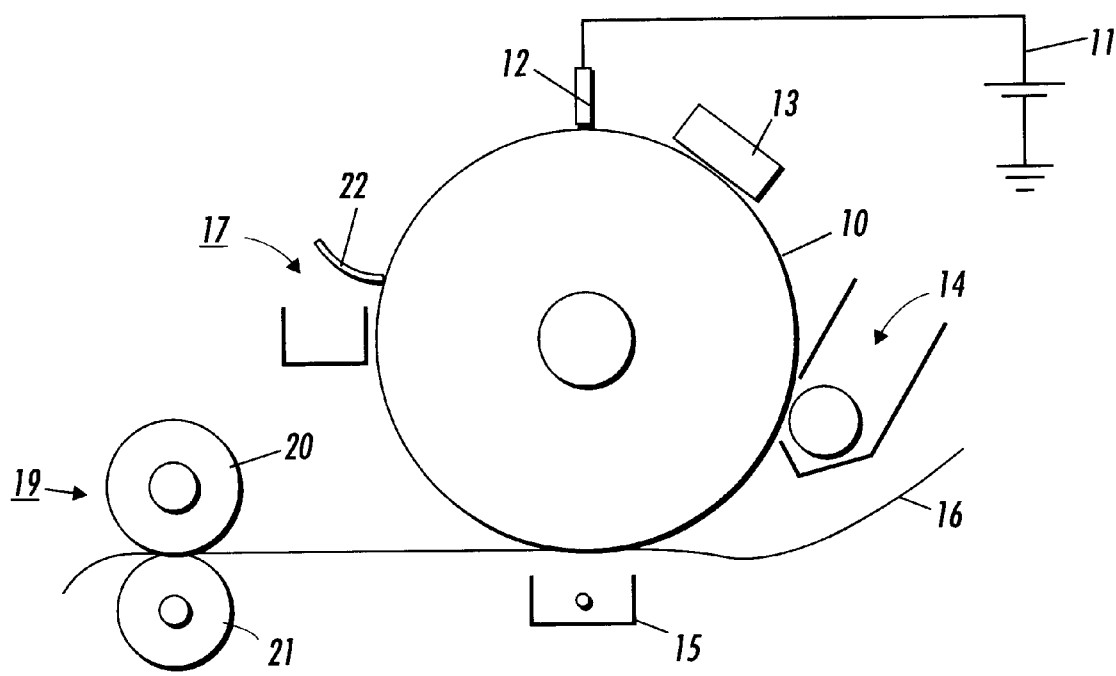
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of an electrical charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Preferably, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
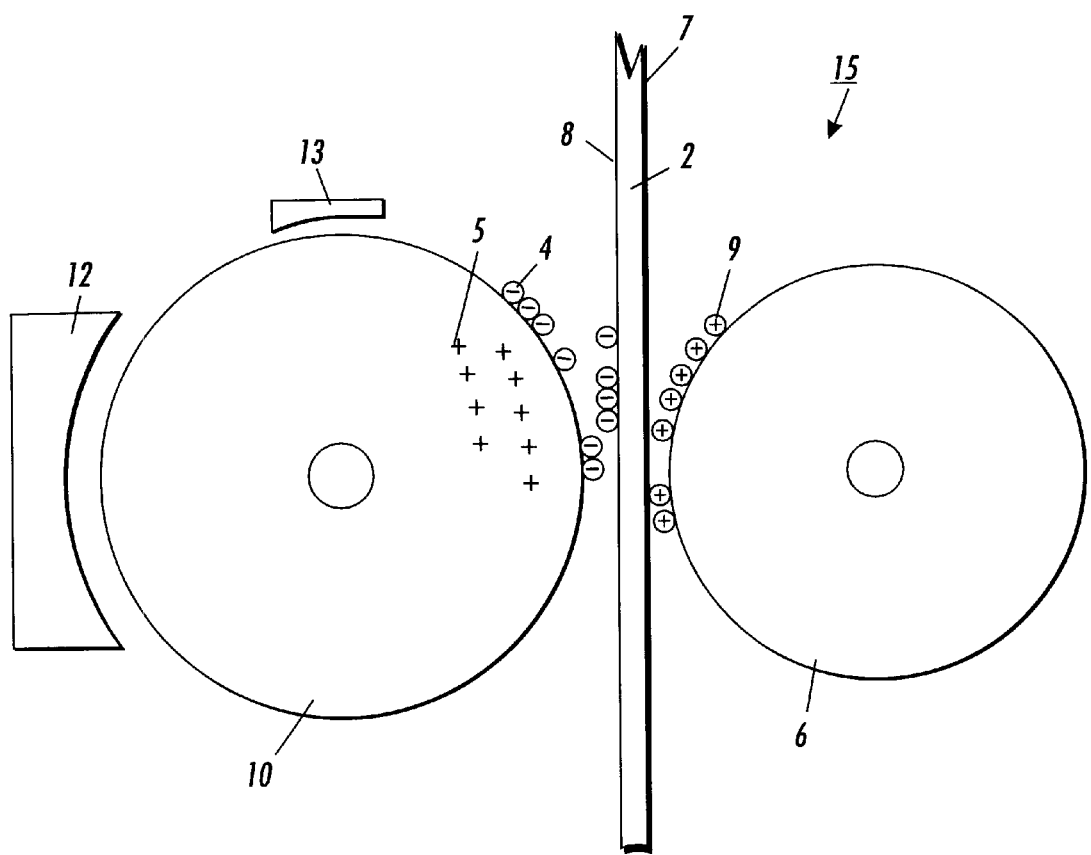
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 1 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In a preferred embodiment of the invention, the multi-image system is a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor has been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In an embodiment, the toner is present in a liquid developer. However, the present invention, in embodiments, is useful for dry development systems also.

A biased transfer roller 6 positioned opposite the photoreceptor drum 10 has a higher voltage than the surface of the photoreceptor drum 10. As shown in FIG. 2, biased transfer roller 6 charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
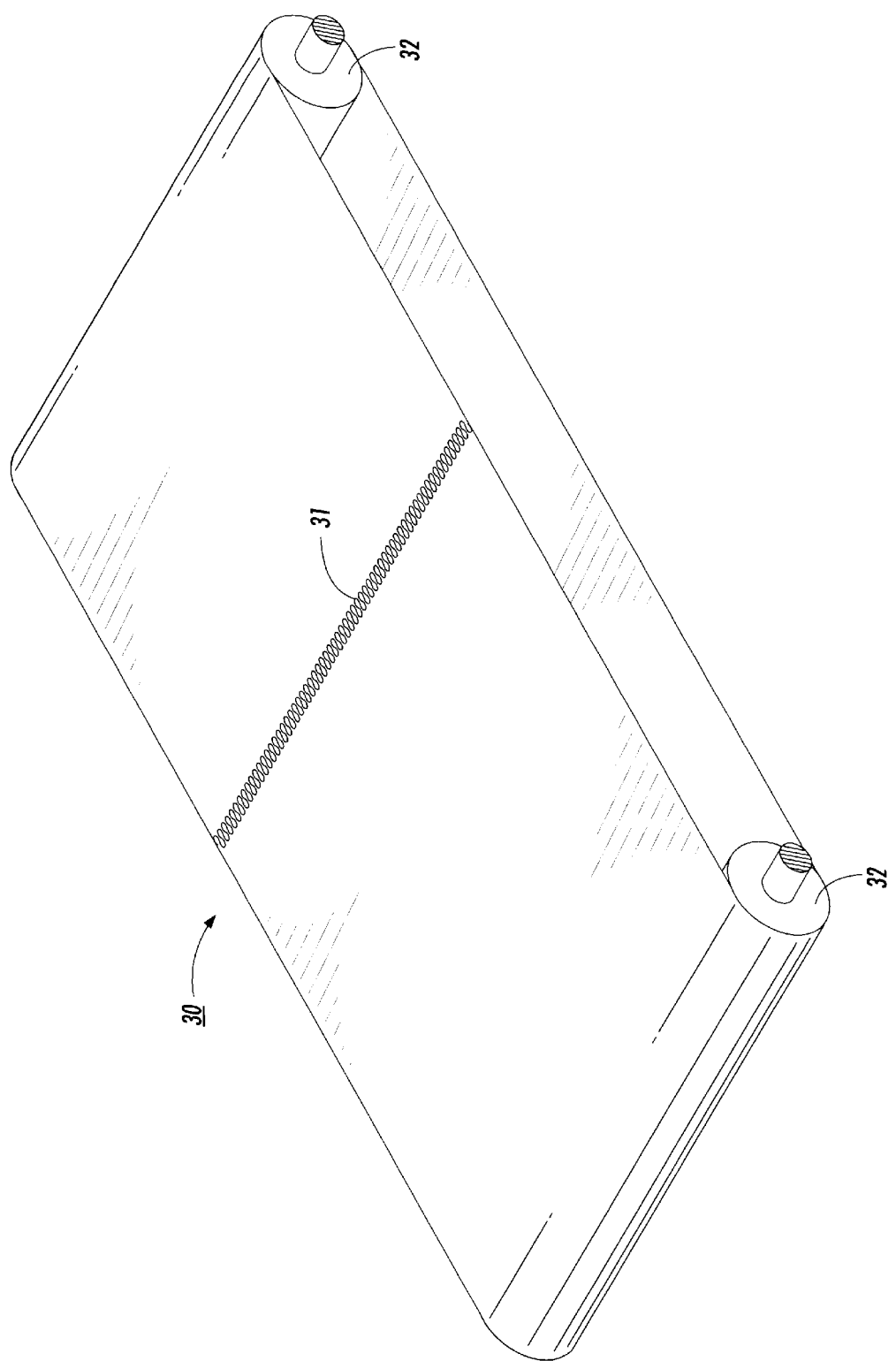
FIG. 3 is an enhanced view of an embodiment of a belt configuration and seam according to the present invention.

FIG. 3 demonstrates an example of an embodiment of a belt in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it may be angled or slanted with respect to the parallel sides. This enables any noise generated in the system to be distributed more uniformly and the forces placed on each mating element or node to be reduced.

The seam formed according to the present invention is one having a thin and smooth profile, of enhanced strength, improved flexibility and extended mechanical life. In a preferred embodiment, the belt ends are held together by the geometric relationship between the ends of the belt material, which are fastened together by a puzzle cut. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by an adhesive, which is compatible with the rest of the belt. The belt, in embodiments, provides improved seam quality and smoothness with substantially no thickness differential between the seam and the adjacent portions of the belt.

Figure 4:
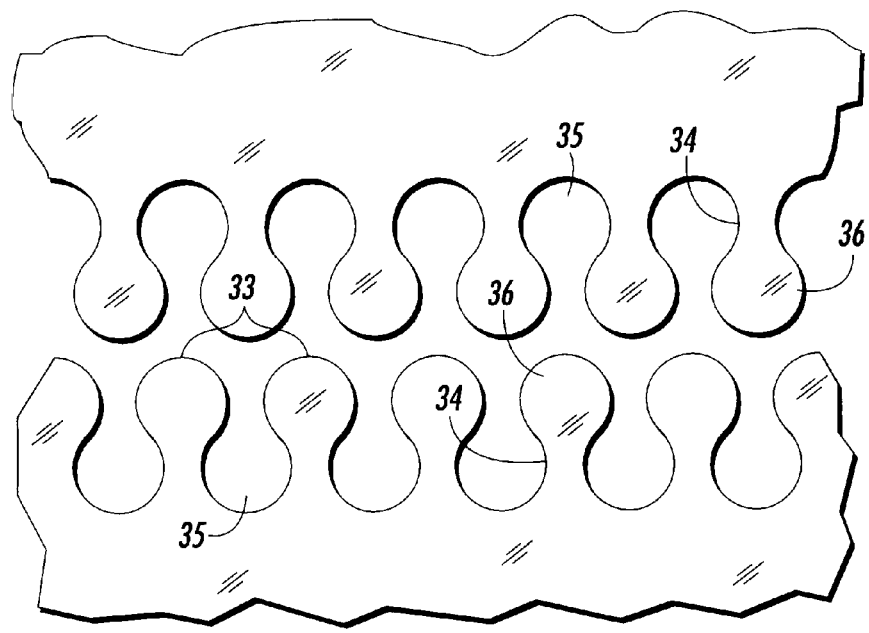
FIG. 4 is an enlargement of a puzzle cut seam having a multiplicity of head and neck members according to one embodiment of the present invention.
Figure 5:
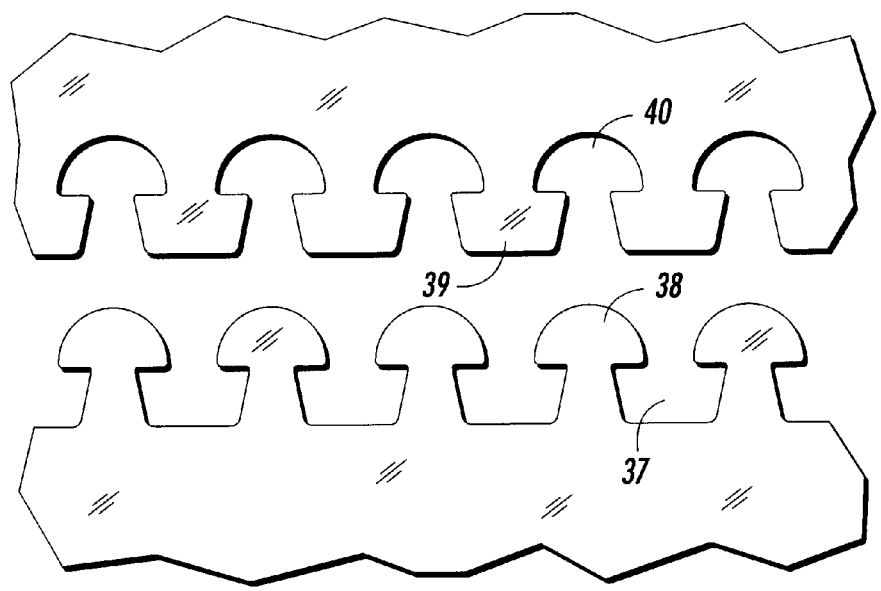
FIG. 5 is an enlargement of a puzzle cut seam having mushroom-shaped puzzle cut members according to another embodiment of the present invention.
Figure 6:
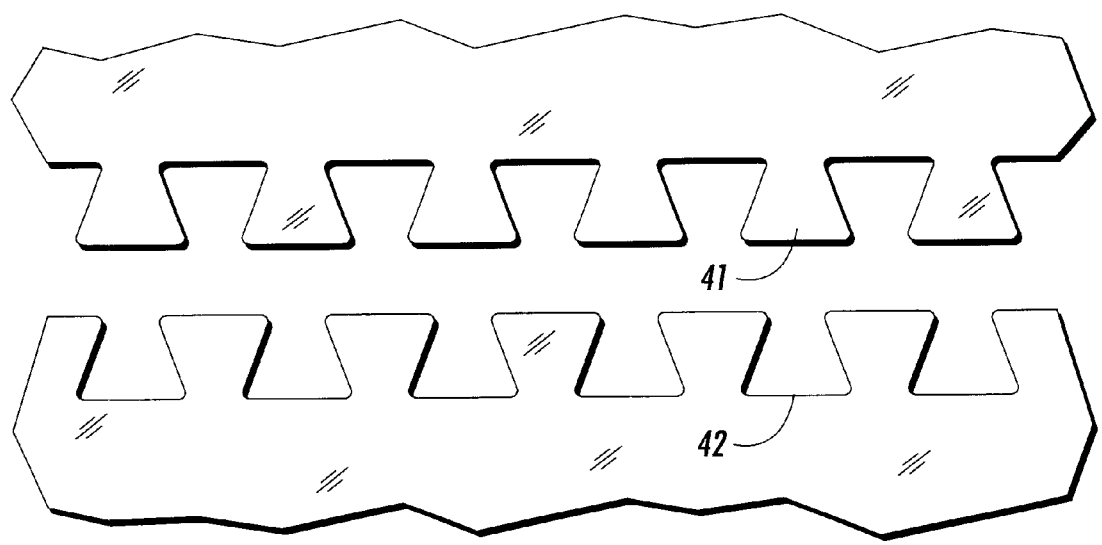
FIG. 6 is an enlargement of a puzzle cut seam having dovetail members according to another embodiment of the present invention.
Figure 7:
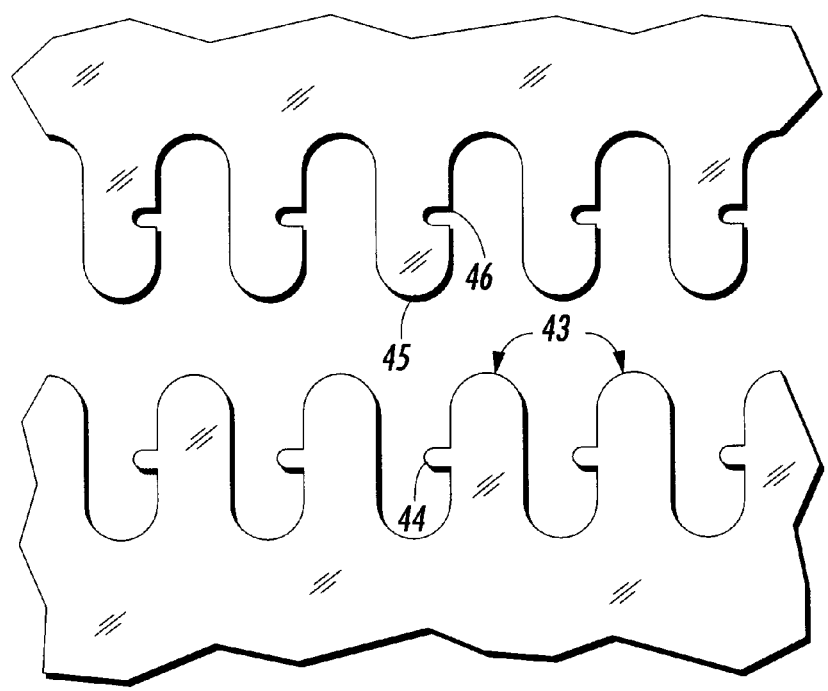
FIG. 7 is an enlargement of a puzzle cut seam having receptacles and teeth members according to another embodiment of the present invention.

An example of an embodiment of a puzzle cut seam having two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 6 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. It is preferred that the interlocking elements all have curved mating elements to reduce the stress concentration between the interlocking elements and permit them to separate when traveling around curved members such as the rolls 32 of FIG. 3. It has been found that with curved mating elements that the stress concentration is lower than with square corners where rather than the stress being uniformly distributed it is concentrated leading to possible failure.

Figure 8:
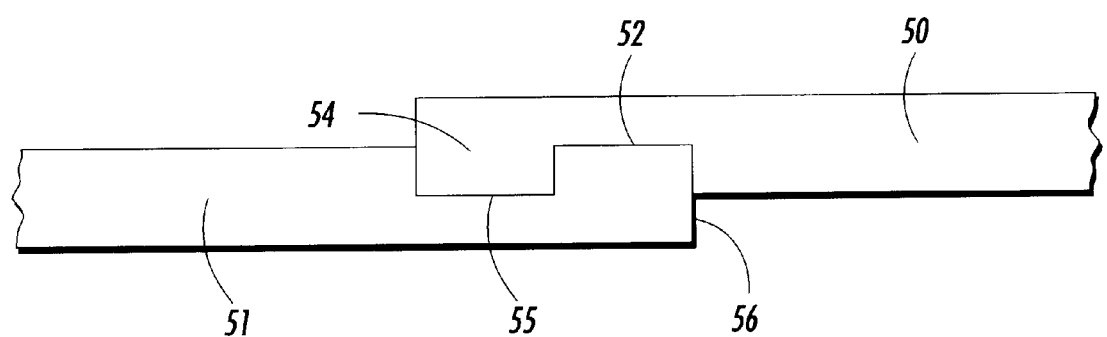
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt as the belt ends.

It is preferred that the height differential between the seam and the rest of the belt (the nonseamed portions of the belt) be practically nil, or from about −25 to about +50 micrometers, preferably from about −5 to about +5 micrometers, and particularly preferred of from about −1 to about +1 micrometers.

The present process, in embodiments, allows for a reduction or elimination of flashing of excess adhesive from the edges of the seaming members following thermal compressive adhesive bonding of the adhesive into the seam.

Following placement of the release layer having adhesive applied thereto and cut to size, onto the seam, the adhesive is then compression molded and thermally bonded into the seam kerf or void. This process of thermal compressive molding is also called "hot melt" bonding. During the thermal compressive adhesive bonding process, with known methods, excess adhesive is forced out toward the edges of the release layer, and an undesirable flash is formed as the excess adhesive flows beyond the release layer. Flashing occurs when excessive adhesive oozes or flashes out between seaming members. The flashing is excess adhesive that is forced outward over the substrate and fills a void that occurs between the top anvil of the heat sealer and the substrate at each edge of the release layer used to support the adhesive strip. The flashing is difficult to remove and complicates the seam finishing process. It further leads to a non-uniform finish of the seam, degradation of motion quality when used in xerographic architectures, and poor image quality over the seam region.

In embodiments, the present process reduces or eliminates the occurrence of flashing of excess adhesive. This is, for example, because just enough adhesive is applied to the seam. The adhesive is forced in a direction perpendicular to the seam fill direction during the thermal compressive adhesive bonding process.

In embodiments, an adhesive strip is formed on a release layer. The release layer is then placed over the belt at the seam, and the adhesive is thermally compressively bonded to the belt. The adhesive flows from the release layer into the seaming members, thereby forming a seamed belt. Excess flashing is reduced or eliminated due in part to the amount and thickness of the adhesive strip in relation to the release layer.

In embodiments, the width of the release liner is determined by or relative to the width of the adhesive strip employed. For example, in embodiments, the width of the release layer is greater than the width of the adhesive strip. In embodiments, the width of the release layer is from about 0.01 to about 20 mm, or from about 1 to about 10 mm, or from about 3 to about 6 mm wider than the width of the adhesive strip. Similarly, the release layer can have a width of from about 1 to about 5 times greater than a width of the adhesive strip, or from about 2 to about 3 times greater than a width of the adhesive strip. This allows for a decrease or elimination of flashing of excess adhesive from the edges of the seam.

In embodiments, the adhesive strip has a width of from about 0.5 to about 10 mm, or from about 1.5 to about 5 mm, or from about 2.5 to about 4 mm. In embodiments, the thickness of the adhesive is from about 0.0001 to about 125 micrometers, or from about 60 to about 80 micrometers.

In embodiments, the dimensions of width and thickness of the adhesive strip are selected such that there is sufficient adhesive available to fully cover the seam area and adequately fill the kerf gap in the seam.

In embodiments, the release layer has a length similar or longer than that of the belt seam, and a width that is larger than that of the belt seam. In embodiments, the adhesive strip has a length similar or longer than that of the belt seam.

The width of the adhesive is usually chosen to be about the same or slightly wider than the seam area. The adhesive will soften and flow or spread when heat and pressure are applied. A narrow strip of adhesive of sufficient thickness could be used to effectively cover a wider area.

The width of the seam, or the distance between mutually mating elements, is from about 0.0001 to about 100 microns, or from about 5 to about 25 microns.

In embodiments, the adhesive strip is placed on the release layer applied to align with only the puzzle-interlocked seamed region of the belt or film member. In embodiments, the adhesive strip is applied in a width less than the width of the release layer. Alternatively, the adhesive strip is placed on the release layer the same or similar width and length as the release layer. The adhesive strip is then cut so as to remove an amount of adhesive from each lateral side of the release layer, such that a lesser width of adhesive strip remains on the release layer. Alternatively, a narrower strip of adhesive can be directly coated or extruded onto a wider release backing tape.

Figure 10:
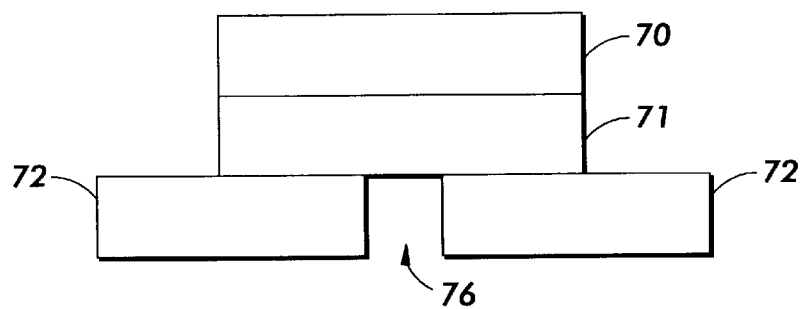
FIG. 10 is an enlarged end view of a known release tape having an adhesive strip applied thereto.

FIG. 10 demonstrates an adhesive strip 71 applied to release layer 70 using known methods. The release layer 70, comprising the adhesive layer 71, which is the same or about the same width as the release layer 70, is applied over the void or kerf 76 between seaming members of the substrate 72. Using known seaming methods, the result is flashing of excess adhesive from the kerf or void 76.

Figure 12:
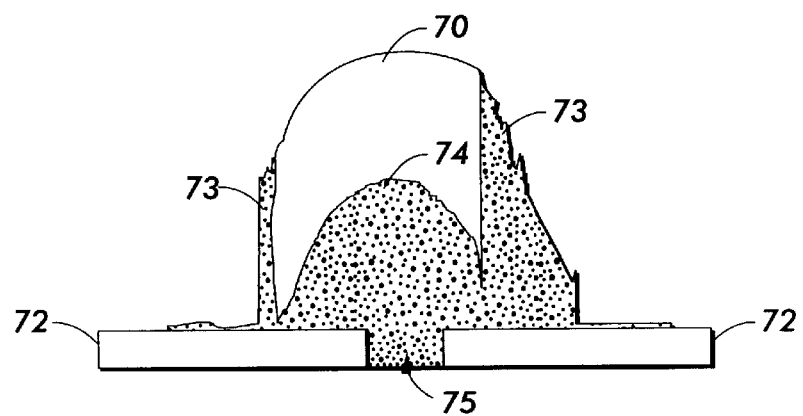
FIG. 12 depicts an enlarged end view of a puzzle cut seam after known adhesive bonding and shows the undesirable flashing of excess adhesive.

FIG. 12 demonstrates the excess flashing. FIG. 12 is an end view of the puzzle cut seam after known adhesive bonding and shows the filled seam kerf 75, the residual adhesive bump 74, the undesirable flashing 73, and the release layer 70. The release layer 70 is removed after compression molding of the adhesive.

Figure 11:
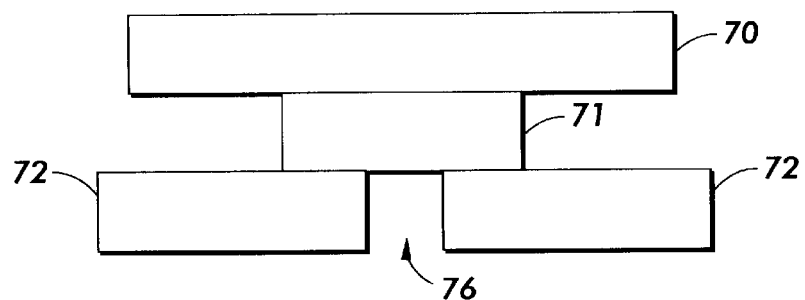
FIG. 11 is an enlarged end view of a release tape having an adhesive strip applied thereto, and depicts the release tape following removal of two end widths of the adhesive strip in accordance with an embodiment of the present invention.

With the present invention, the adhesive strip 71 has a width that is less than that of the release layer. As shown in FIG. 11, the adhesive layer 71 is smaller than the release layer 70. The adhesive layer may be either placed on the release layer to a width less than that of the release layer. Alternatively, the adhesive is placed on the release layer in the same or similar width as that of the release layer. In this embodiment, the adhesive layer is then cut from the lateral sides of the release layer to a smaller width than the release layer. If the adhesive strip is cut at its sides, the length of the adhesive strip stays the same. The sides of the adhesive strip that are cut may be equal or different in width. In this manner, excess flashing is reduced or eliminated following hot melt or thermal compressive bonding of the adhesive into the seam kerf or void 76.

Known hot melt or thermal compressive adhesive bonding procedures can be used to force the adhesive between seaming members. Known thermal bonding procedures include aligning and pressing the seam in the jaws of a Vetrod Heat Sealer, Sencorp Heat Sealer, or the like, heated platen press, or any other fixture which can apply heat and pressure to the seam area. Heat and pressure are applied during this hot melt adhesive bonding process. Examples of temperatures include from about 40 to about 250° C., or preferred from about 100 to about 150° C., at a time of from about 30 seconds to about 24 hours, or from about 5 minutes to about 2 hours, or from about 5 minutes to about 15 minutes. The pressure during the heat curing is from about 0.5 psi to about 100 psi, or from about 2 psi to about 60 psi.

Alternatively the adhesive may also be applied as a liquid. The two puzzle cut ends of the substrate are held together with a suitable removable heat resistant tape such as Kapton®. The liquid adhesive is applied directly to seam kerf with a syringe on the side opposite the heat resistant tape. The adhesive is allowed to flow into and fill the seam kerf, then is heat cured. The heat resistant tape is removed after the adhesive has been cured or crosslinked. The ranges of temperature for curing the adhesive when applied as a liquid are as follows (pressure is not applied): a time of from about 1 minute to about 24 hours, or from about 20 to about 30 minutes, at a temperature of from about 80° C. to about 180° C., or preferred from about 100° C. to about 130° C. Heat may be applied by, for example, a heat gun, oven, or other suitable means.

In an embodiment, the belt is postcured following adhesive bonding. Postcuring procedures useful in curing the seam include thermal curing and infrared curing. Examples of heat curing include use of moderate heat once the adhesive is placed in the seam crevice. This moderate heating also increases the crosslinking/solidification reaction and increases the seam processing and belt fabrication speed. In embodiments, the adhesive may be post-cured between the seaming members at a time of from about 1 minute to about 1 hour, or from about 20 to about 30 minutes, at a temperature of from about 80 to about 220° C., or from about 100 to about 180° C. Heat may be applied by, for example, a heat gun, oven, or other suitable means.

Figure 9:
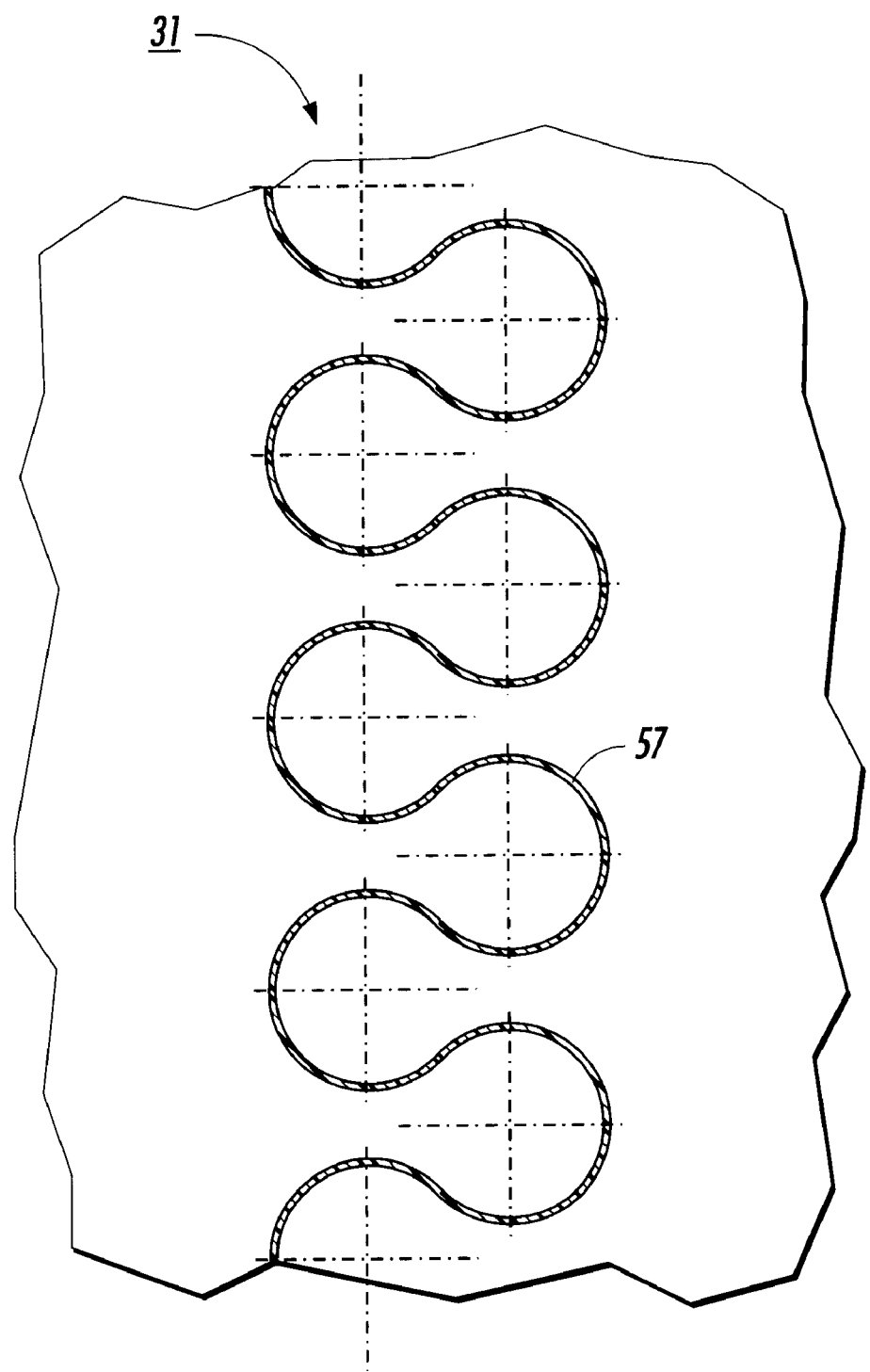
FIG. 9 depicts an enlarged version of a belt according to one embodiment of the present invention and demonstrates the adhesive between puzzle cut members.

As shown in one embodiment of a puzzle cut seam 31 according to the present invention, the adhesive is present between the puzzle cut members and at the seam crevice 57 of FIG. 9.

The adhesive can be chosen to have a resistivity within the range desired for electrostatic transfer of toner. In embodiments, the resistivity of the seam is the same or similar to that of the belt in order to provide the same electrical properties for the seam and the rest of the belt. In embodiments, a volume resistivity for toner transfer performance is from about $10^5$ to about $10^{13}$ ohms-cm, or from about $10^9$ to about $10^{11}$ ohms-cm. When the belt and the seam of the belt have a same or substantially the same electrical resistance, the toner transfer at the seam is the same or substantially the same as the transfer at the belt. Such transfer at the seam provides an invisible or substantially invisible seam. The electrical properties can be tailored by varying the amount of fillers, by changing the type of filler added, and/or by changing the curing procedure.

The adhesive strip comprises an adhesive that is strong enough to bond the seaming members and to keep the seam together during repeated cycling, even in industrial use. Examples of suitable materials for adhesives include polyamides, polyvinyl butyral, phenolic resins (for example, nitrile-phenolic), epoxy resins, and the like, and mixtures thereof. One specific example of an adhesive for use with a belt seam, preferably a puzzle cut belt seam, is a polyamide resin. In embodiments, the polyamide resin is soluble in alcohols, mixtures of alcohols or mixtures of alcohols and cosolvents. By "alcohol-soluble," Applicants refer to materials, which dissolve in alcohols such as butanol, ethanol, methanol and the like. Cosolvents include any other suitable organic or inorganic solvents. In embodiments, the polyamide resin in the adhesive has functional pendant groups selected from the group consisting of methoxy, ethoxy and hydroxy pendant groups. In embodiments, the pendant functional group is a methylene methoxy group. In embodiments, the polyamide has the following formula:

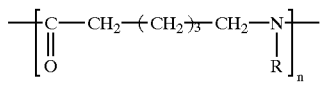

wherein n is a number of from about 50 to about 1,000, or from about 150 to about 500, or about 270, and wherein R is selected from the group consisting of hydrogen; alkyl having from about 1 to about 20 carbons, or from about 1 to about 10 carbons, such as methyl, ethyl, propyl and the like; alkoxy having from about 1 to about 20 carbons, or from about 1 to about 10 carbons such as methoxy, ethoxy, propxy and the like; alkyl alkoxy having from about 1 to about 20 carbons, or from about 1 to about 10 carbons such as methyl methoxy, methyl ethyoxy, ethyl methoxy, methyl dimethoxy, methyl trimethoxy, and the like; and alkylene alkoxy having from about 1 to about 20 carbons, or from about 1 to about 10 carbons such as methylene methoxy, ethylene ethoxy, and the like. In embodiments, monomers of the above formula can be included in an adhesive composition, wherein R can be hydrogen, deuterium, methyl methoxy, and methyl dimethoxy, or R in the adhesive composition can be from about 40 to about 80 mole percent hydrogen, or from about 50 to about 65 mole percent hydrogen, or about 64 mole percent hydrogen; and from about 20 to about 45 mole percent methyl methoxy, or from about 30 to about 35 mole percent methyl methoxy, or about 32 mole percent methyl methoxy; and from about 1 to about 10 mole percent methyl dimethoxy, or from about 1 to about 5 mole percent methyl dimethoxy, or about 4 mole percent methyl dimethoxy. Typical commercially available alcohol-soluble polyamide polymers suitable for use herein include those sold under the tradenames LUCKAMIDE® 5003 from Dai Nippon Ink, NYLON® 8, CM4000® and CM8000® both from Toray Industries, Ltd., and other N-methylenemethoxy pendant polyamides such as those prepared according to the method described in Sorenson and Campbell, "Preparative Methods of Polymer Chemistry," second edition, pg. 76, John Wiley & Sons, Inc., 1968, and the like and mixtures thereof.

A suitable, fine powder, conductivity-enhancing filler that is uniformly dispersed without agglomerates in the above resins, can be used with the adhesive. In embodiments, the filler is a carbon filler, metal oxide filler, polymer filler, charge transporting molecule or mixtures thereof. Other conductive fillers include silicon powder and pyrolzed polyacrylonitrile particles and fibers.

In embodiments, the filler is a carbon filler, such as carbon black, graphite, fluorinated carbon, or mixtures thereof. Fluorinated carbons include those having the formula $CF_x$ with x representing the number of fluorine atoms and generally being up to about 1.5, preferably from about 0.01 to about 1.5, and particularly preferred from about 0.04 to about 1.4. Other preferred fluorinated carbons are poly (dicarbon monofluoride) which is usually written in the shorthand manner $(C_2F)_n$. Other fluorinated carbons selected include those described in U.S. Pat. No. 4,524,119 to Luly et al., the subject matter of which is hereby incorporated by reference in its entirety, and those having the tradename ACCUFLUOR®, (fluorinated carbons from Advance Research Chemicals, Inc., Catoosa, Okla.). Examples include ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2 = CF_x$.

Metal oxide fillers include titanium dioxide, tin (II) oxide, aluminum oxide, indium-tin oxide, magnesium oxide, copper oxide, iron oxide, and the like, and mixtures thereof.

Polymer fillers include polytetrafluoroethylene, polypyrrole, polyacrylonitrile (for example, pyrolyzed polyacrylonitrile), polyaniline, and mixtures thereof.

Charge transporting molecules include bis (dihydroxydiethylamino) triphenyl methane (DHTPM), bis (diethylamino) triphenyl methane (TPM), dihydroxy tetraphenyl biphenylene diamine (DHTBD), and the like, and mixtures thereof. Particularly preferred charge transporting molecules include DHTPM and DHTBD.

In embodiments, the filler is present in the adhesive in an amount of from about 2 to about 80, or from about 20 to about 50 percent by weight of total solids. Total solids, as used herein, refers to the amount of polymer resin, filler, crosslinking agent, other additives, and other solids present in the adhesive.

Crosslinking agents can be used in combination with the polyamide to promote crosslinking of the polymer, thereby providing a strong bond. Examples of crosslinking agents include oxalic acid, and the like and mixtures thereof.

The release layer material can be selected from various coated Kraft papers, polymeric films such as polyvinylidene fluoride, fluorosilicone, and the like. Examples of commercially available materials include Industrial Fluorosilicone Release Film IFS3 Number 44461 from Mylan Technologies, Inc., St. Albans, Vt.; TEDLAR® release films from E. I. DuPont de Nemours and Company; various coated Kraft papers; and the like.

The process can be used with many substrates. In embodiments, it can be used with substrates that are robust enough to undergo multiple cycling through rigorous use. Examples of suitable substrate materials include polyimides with or without conductive fillers, such as semiconductive polyimides such as polyanaline polyimide, carbon filled polyimides, carbon filled polycarbonate, and the like. Examples of commercially available polyimide substrates include KAPTON® and UPLIEX® both from DuPont, and ULTEM from GE.

The substrate may include a filler. Preferably, the filler, if present in the substrate, is present in an amount of from about 1 to about 60, and preferably from about 3 to about 40 percent by weight of total solids. Examples of suitable fillers for use in the substrate include carbon fillers, metal oxide fillers, doped metal oxide fillers, other metal fillers, other conductive fillers, and the like. Specific examples of fillers include carbon fillers such as carbon black, fluorinated carbon black, graphite, low conductive carbon, and the like, and mixtures thereof; metal oxides such as indium tin oxide, zinc oxide, iron oxide, aluminum oxide, copper oxide, lead oxide, and the like, and mixtures thereof; doped metal oxides such as antimony-doped tin oxide, antimony-doped titanium dioxide, aluminum-doped zinc oxide, similar doped metal oxides, and mixtures thereof; particles such as silicone particles and the like; and polymer particles such as polytetrafluoroethylene, polypyrrole, polyaniline, doped polyaniline and the like, and mixtures thereof.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1
Preparation of Intermediate Transfer Belt

A polyimide film substrate was obtained from DuPont. The belt substrate comprised polyaniline and carbon filled polyimide. The resistivity was tested and found to be from about $10^9$ to about $10^{10}$ ohm-cm. The belt ends that were to be joined were treated with a primer shortly before assembly, to help improve adhesion. The puzzle cut ends were wiped with a 10% solution of 3-Aminopropyltriethoxysilane (Aldrich) in toluene and allowed to dry for 10 min at 40° C.

Optionally, the belt ends to be joined can be subjected to a "chemical etch" treatment to help improve adhesion. The puzzle cut ends can be dipped in 1N aqueous NaOH solution for about 10 minutes, followed by 10 minutes in 1N aqueous HCl solution. The ends can then be rinsed with distilled water and

Example 2
Preparation of Polyamide Adhesive on Release Layer

The following were combined in an 8-ounce amber bottle and heated with magnetic stirring in a water bath at about 60° C.: about 4 grams LUCKAMIDE® (from Dai Nippon Ink), about 10 grams methanol, and about 10 grams 1-propanol. A solution formed within 30 minutes. This solution was then allowed to cool to about 25° C. Subsequently, about 0.3 grams of trioxane (a crosslinker) and about 0.4 grams oxalic acid were added and the mixture was warmed under about 50° C. tap water until a solution formed.

A "Hot Melt" LUCKAMIDE® adhesive was prepared by solvent coating a film (3 to 5 mil dry thickness) of the adhesive on a release layer so as to cover the release layer, such as IFS3 Industrial Fluorosilicone Release Film Number 44461 from Mylan Technologies, Inc., St. Albans, Vt.; or Tedlar® from DuPont. The solvent was allowed to evaporate in an oven at about 50° C. (well under its curing temperature of 110 to 130° C.) for about 1 hour. Strips of the dried semiconductive LUCKAMIDE® adhesive on the release film were cut slightly wider than the puzzle cut seam and were used to bond (under heat and pressure) the puzzle cut seam together. The conductivity of the coating may be adjusted by varying the amounts of DHTBD, oxalic acid, and carbon black. To produce a more conductive matrix, the addition of carbon black rendered the composition considerably more conductive, because carbon black injects charges into the hole conducting matrix under the influence of applied electrical fields.

Example 3
Preparation of Polyamide Adhesive on Release Layer

The formulation described in Example 2 was prepared, except that 3.6 grams of DHTBD was used instead of 4 grams, and 0.4 grams of either triphenyl methane (TPM) or dihydroxy triphenyl methane (DHTPM) was used.

Example 4
Preparation of Image-on-Seam Puzzle Cut Seamed Belt

The two puzzle cut ends of the polyimide film prepared in Example 1 were brought together and aligned on top of a 25 mm wide polished strip of spring steel shim stock spanning the length of the lower jaw of a Technoseal Vertrod Thermal Impulse Heat Sealer (Mod. 20EP/P-1/4-WC-CAN-DIG-I) with the assistance of vacuum holdown tables mounted on both sides of the Heat Sealer. A freestanding film of the LUCKAMIDE® adhesive formulation prepared in Example 3 above was coated on a release layer (TEDLAR® or IFS3 of preferably 60 to 100 microns thick). A narrow strip (about 8 mm wide) of material was cut to a length sufficient to adequately cover the puzzle-cut seam area on the belt substrate. A strip of about 2 mm wide adhesive was cut from each side of the adhesive strip and removed from the release layer leaving a 4 mm wide adhesive strip down the center. The strip of hot melt adhesive/release layer was laid across the top of the seam area such that the adhesive strip was covering the seam.

A similar strip of about 25 mm wide of spring steel shim stock was laid on top of the adhesive tape. The heat sealer was set to a nominal impulse temperature of about 248° F. (120° C.) and the adhesive was compression molded into the seam in the heat sealer. This caused the adhesive film to melt and flow into the seam area filling it completely. Ideally, the seam should remain in the heat sealer with applied temperature and pressure for about 10 minutes to initiate crosslinking of the thermoset adhesive. The seamed belt was removed from the fixture and placed in a forced air convection oven for an additional 30 minutes at 120° C. to postcure the adhesive. The seamed belt was then subjected to finishing (sanding) and polishing steps to remove excess adhesive and bring the seam area topography in line with the rest of the belt.

Example 5
Testing of Puzzle Cut Seam Prepared by Known Process

A belt made by the procedures as set forth in Example 2 was tested. An 80 micrometer thick by 0.4-cm wide strip of adhesive/release liner was cut from a sheet of solvent coated uncured adhesive. The strips were cut to a length suitable for the width (40 centimeters) of the belt substrate being seamed. The adhesive/release layer strips were compression molded into the puzzle cut seam kerf at 120° C. for 30 minutes.

In addition to filling the seam kerf during the "thermal compressive" or hot melt adhesive bonding process, excess adhesive flowed over the top of the intermediate transfer belt substrate and beyond the release layer forming an objectionable adhesive flashing buildup on each side of the seam region. The release layer, typically 80 microns thick, acted as a spacer between the top shim of the Technoseal Vertrod Thermal Impulse Heat Sealer and the intermediate transfer belt during "thermal compressive" adhesive bonding. This spacer created triangular shaped voids at both edges of the release layer as the steel shim flexed, under pressure, to contact the intermediate transfer belt surface beyond the release layer. These voids filled with adhesive to form the flashing. The flashing can be as high or higher (80 micrometers) than the release layer and vary in width from a few tenths of microns to several hundred.

Figure 13:
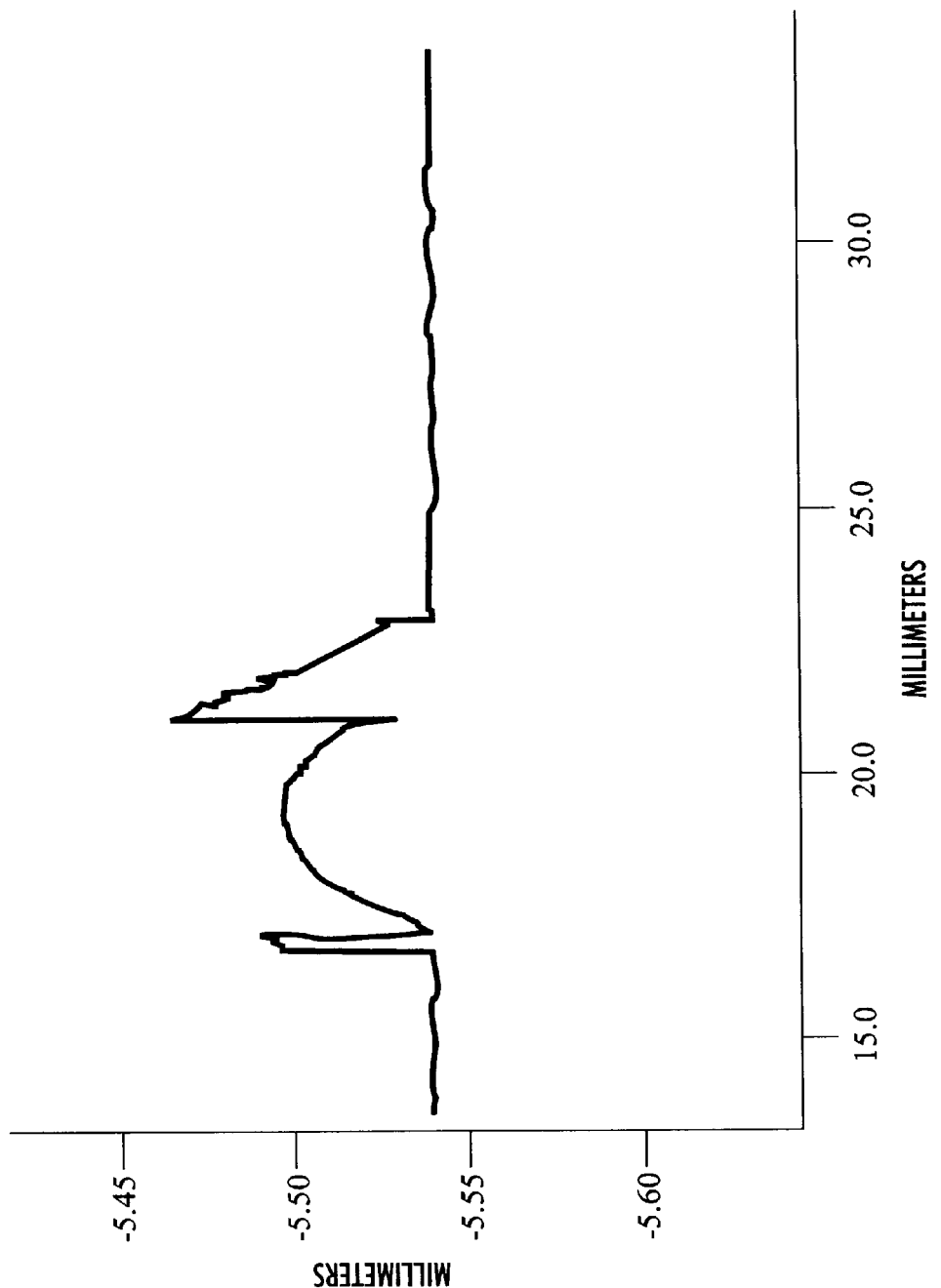
FIG. 13 is a graph of a height and width profile trace of the residual adhesive and flashing over the seam showing flashing of adhesive using known seaming methods.

The height and width profiles of the residual adhesive over the belt seam were measured with a Mahr Concept 6.3 Perthometer surface texture measuring instrument (Mahr Gmbh Gottingen, Germany or Mahr Corporation, Cincinnati, Ohio.) A typical profile across the seam before finishing is illustrated in FIG. 13. This figure is an end on view of the belt seam illustrating a height and width profile trace of the residual adhesive and flashing over the seam. This profile was obtained by moving the stylis of the Perthometer across the seam, from the belt substrate on one side to the belt substrate on the opposite side. The height of the residual adhesive bump was measured at 43 micrometers while its width was measured at 4 mm. There was objectionable adhesive flashing at the edges of the adhesive bump that was about 80 micrometers thick and can be hundreds of micrometers in width. There was no excess residual adhesive bump or flashing on the opposite side of the seam from which the adhesive was applied.

The flashing caused extra time to be spent trying to remove the excess adhesive. This resulted in increased labor manufacturing costs, and hence a more expensive product. In addition, not all the excess adhesive could be removed following adhesive bonding, and therefore, the excess adhesive caused a bump at the seam. The result was a decrease in transfer or image quality and mechanical performance of the belt, and ultimately, a decrease in belt life and customer satisfaction. A bump in the belt may also introduce poor motion quality into the system as it passes various elements such as cleaning blades, roller nips, and others.

Example 6

Figure 14:
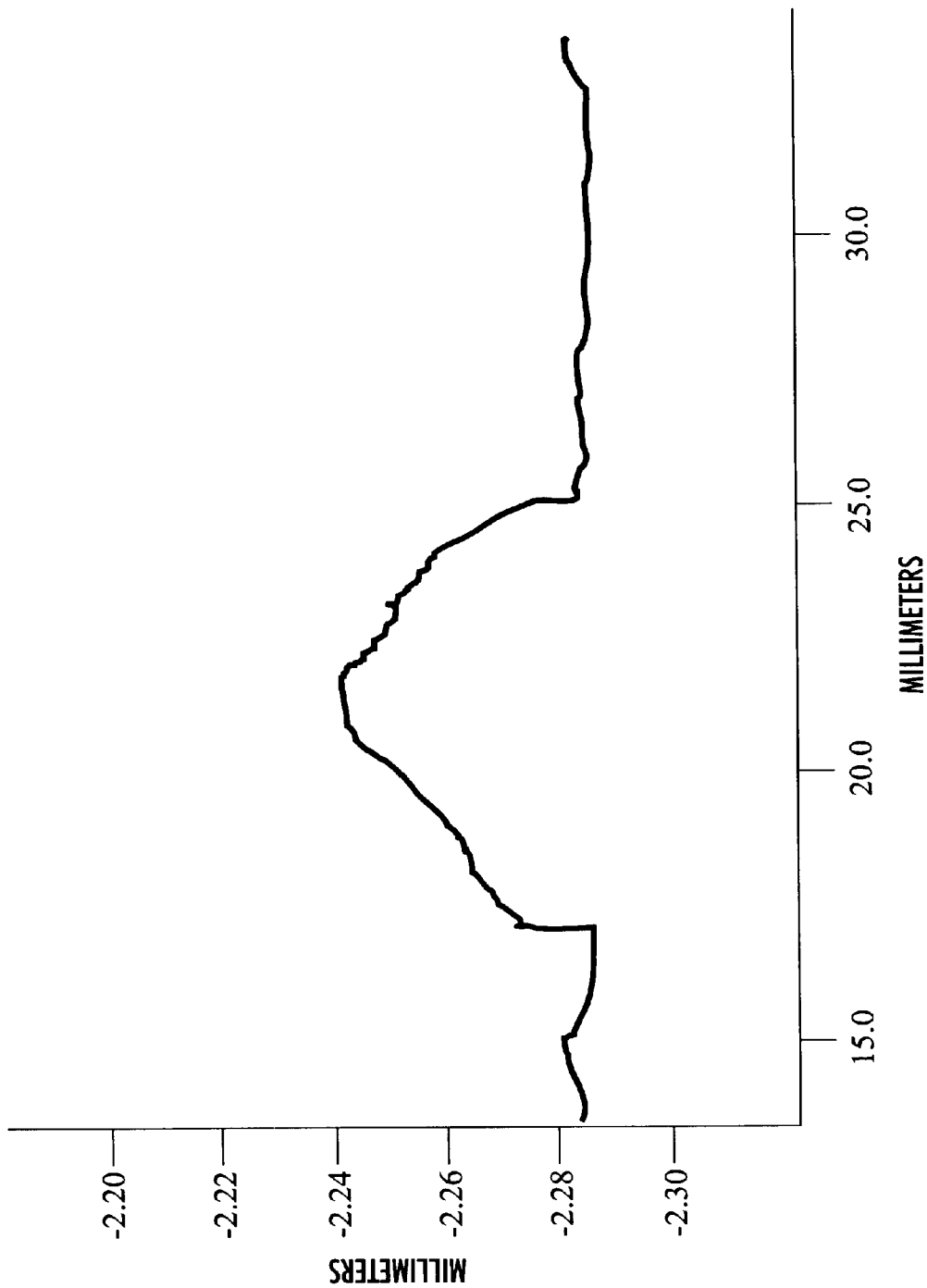
FIG. 14 is a graph illustrating a height and width profile trace of the residual adhesive over the seam showing little or no flashing using an embodiment of the process of the present invention.

Testing of Puzzle Cut Seam Prepared in Accordance with an Embodiment of the Invention A belt prepared by the process in accordance with the Example 4 was tested. The testing procedure was the same as that explained in Example 5. FIG. 14 demonstrates that little or no flashing occurred following adhesive bonding with the wider release layer. Narrow adhesive strips were prepared by scoring two parallel lines, 4 mm apart, in the center of a 10 mm wide adhesive/release layer strip having sufficient length for the application. Excess adhesive on either side of the 4-mm wide strip was removed from the release layer, as illustrated in FIG. 11. This concept moved the step between the release layer and the intermediate transfer belt sufficiently out of the range of flow of the adhesive. A typical profile of the residual adhesive over the seam using this method of seam bonding is illustrated in FIG. 14. This figure is an end on view of the belt seam illustrating a height and width profile trace of the residual adhesive over the seam and is obtained by moving the stylis of the Perthometer across the seam, from the belt substrate on one side to the belt substrate on the opposite side. The height of the residual adhesive was 43 micrometers while its width was 8 mm.

The seam profile did not show flashing at the edges of the adhesive bump. There was no excess residual adhesive bump on the opposite side of the seam from which the adhesive was applied. The results clearly showed that flashing was successfully eliminated with this "Flashless" hot melt adhesive bonding technique. The residual adhesive pile height and width were more uniform using this method of adhesive bonding, thus making seam finishing significantly easier, and less costly.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A process for flashless hot melt adhesive bonding of an endless seamed flexible belt, wherein the belt comprises a first end and a second end, each of the first end and the second end comprising a plurality of mutually mating elements which join in an interlocking relationship to form a seam, the belt comprising a substrate and the seam comprising an adhesive, the process comprising:
    a) providing an adhesive strip on a front side of a release layer, wherein the release layer is wider than the adhesive strip;
    b) providing the release layer containing the adhesive strip over the seam, wherein the front side of the release layer containing the adhesive strip is in contact with the seam and mutually mating members; and
    c) subjecting the adhesive strip to thermal compressive adhesive bonding, wherein the adhesive strip melts and flows between the mutually mating members.

2. A process in accordance with claim 1, wherein said thermal compressive adhesive bonding is at a temperature of from about 40 to about 250° C.

3. A process in accordance with claim 2, wherein said temperature is from about 100 to about 150° C.

4. A process in accordance with claim 1, wherein said thermal compressive adhesive bonding is at a pressure of from about 0.5 psi to about 100 psi.

5. A process in accordance with claim 4, wherein said pressure is from about 2 psi to about 60 psi.

6. A process in accordance with claim 1, further comprising:
    d) postcuring said belt seam.

7. A process in accordance with claim 6, wherein said postcuring is at a time of from about 1 minute to about 1 hour at a temperature of from about 80 to about 220° C.

8. A process in accordance with claim 7, wherein said temperature is from about 100 to about 180° C.

9. A process in accordance with claim 1, wherein said release layer has a width of from about 0.01 to about 20 mm wider than a width of said adhesive strip.

10. A process in accordance with claim 9, wherein said width of said release layer is from about 1 to about 10 mm wider than the width of said adhesive strip.

11. A process in accordance with claim 10, wherein said width of said release layer is from about 3 to about 6 mm wider than the width of said adhesive strip.

12. A process in accordance with claim 1, wherein said release layer has a width of from about 1 to about 5 times greater than a width of the adhesive strip.

13. A process in accordance with claim 12, wherein said release layer has a width of from about 2 to about 3 times greater than the width of the adhesive strip.

14. A process in accordance with claim 1, wherein said adhesive comprises a resin selected from the group consisting of polyamide resins, polyvinyl butyral resins, phenolic resins, epoxy resins, and mixtures thereof.

15. A process in accordance with claim 1, wherein said adhesive further comprises an electrically conductive filler selected from the group consisting of carbon fillers, metal oxide fillers, polymer fillers, charge transporting molecules, and mixtures thereof.

16. A process in accordance with claim 1, wherein said plurality of mutually mating elements are in the form of a puzzle cut pattern.

17. A process in accordance with claim 16, wherein said mutually mating elements comprise a first projection and a second receptacle geometrically oriented so that said second receptacle on the first end receives the first projection on the second end and wherein said first projection on said first end is received by said second receptacle on the second end to form a joint between the first and second ends.

18. A process in accordance with claim 1, wherein said adhesive further comprises a quaternary ammonium salt.

19. A process in accordance with claim 1, wherein said adhesive strip has a thickness of from about 0.0001 to about 125 micrometers.

20. A process in accordance with claim 19, wherein said thickness is from about 60 to about 80 micrometers.

21. A process for flashless hot melt adhesive bonding of an endless seamed flexible belt, wherein the belt comprises a first end and a second end, each of the first end and the second end comprising a plurality of mutually mating elements which join in an interlocking relationship to form a seam, the belt comprising a substrate and the seam comprising an adhesive, the process comprising:

a) providing an adhesive layer on a front side of a release layer so as to cover an entire width of the release layer;

b) removing an amount of adhesive strip from the release layer;

c) providing the release layer containing the adhesive strip over the seam, wherein the front side of the release layer containing the adhesive strip is in contact with the seam and mutually mating members; and d) subjecting the adhesive strip to thermal compressive adhesive bonding, wherein the adhesive strip melts and flows between the mutually mating members.

22. A process for flashless hot melt adhesive bonding of an endless seamed flexible belt, wherein the belt comprises a first end and a second end, each of the first end and the second end comprising a plurality of mutually mating elements which join in an interlocking relationship to form a seam, the belt comprising a substrate and the seam comprising an adhesive comprising a resin selected from the group consisting of polyamide resins, polyvinyl butyral resins, phenolic resins, epoxy resins, and mixtures thereof, the process comprising:

a) providing an adhesive strip on a front side of the release layer, wherein the release layer is wider than the adhesive strip;

b) providing the release layer containing the adhesive strip over the seam, wherein the front side of the release layer containing the adhesive strip is in contact with the seam and mutually mating members; and c) applying the release layer to the seam, wherein the adhesive strip is thermally compressive bonded between the mutually mating members.

* * * * *